United States Patent [19]
Persson

[11] Patent Number: 5,192,166
[45] Date of Patent: Mar. 9, 1993

[54] METHOD OF CONTROLLED BENDING OF A PIPELINE DURING LAYING THEREOF IN THE SEA

[75] Inventor: Tor Persson, Kristianstad, Sweden

[73] Assignee: International Technologies A/S, Oslo, Norway

[21] Appl. No.: 858,282

[22] Filed: Mar. 26, 1992

[30] Foreign Application Priority Data

Apr. 15, 1991 [NO] Norway ................................ 911464

[51] Int. Cl.$^5$ .............................................. F16L 1/16
[52] U.S. Cl. .................................. 405/168.1; 405/167; 405/171
[58] Field of Search ............. 405/158, 166, 167, 168.1, 405/168.2, 169, 171; 285/223, 233, 321

[56] References Cited

U.S. PATENT DOCUMENTS

| | | | |
|---|---|---|---|
| 3,555,835 | 1/1971 | Smith .................................... | 405/167 |
| 3,712,648 | 1/1973 | Clifford ................................ | 285/321 |
| 3,756,034 | 9/1973 | Lochridge et al. .................. | 405/167 |
| 3,813,477 | 5/1974 | Fischer ........................... | 405/168.1 X |
| 3,893,305 | 7/1975 | Walker .............................. | 405/168.1 |
| 3,911,689 | 10/1975 | Hogan ........................... | 405/168.1 X |
| 3,977,201 | 8/1976 | Bittner .......................... | 405/168.2 X |
| 4,011,620 | 3/1977 | Southgate ...................... | 405/171 X |

*Primary Examiner*—David H. Corbin
*Attorney, Agent, or Firm*—Browdy and Neimark

[57] ABSTRACT

A method is described for controlled bending of a pipeline during the laying thereof in the sea, utilizing bend controlling/stopping means which are mounted on the pipeline as a sleeve and interact with the pipeline. To achieve cold bending under controlled conditions, the pipeline is weight loaded internally at the selected bending zone. The weight loading may be achieved by means of a flexible string of weight elements and/or by introducing into the pipe a suitable heavy, readily flowable weight mass, for example, drilling fluid.

8 Claims, 3 Drawing Sheets

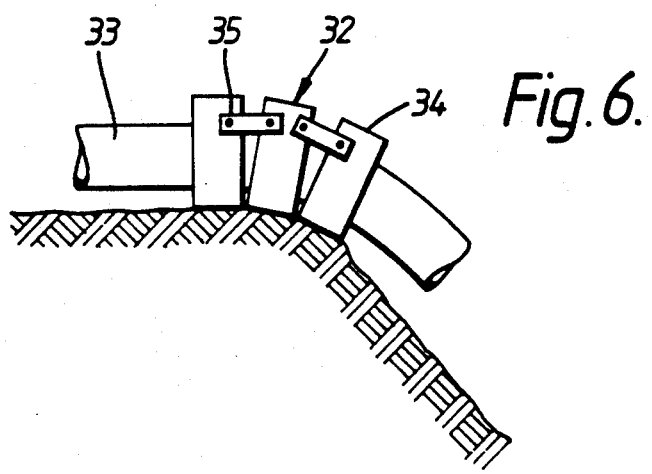
Fig. 6.
Fig. 7.
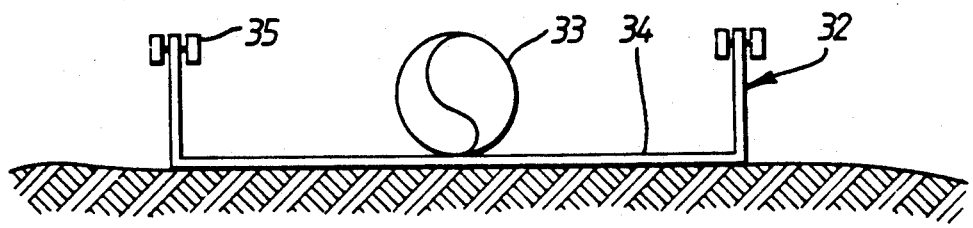
Fig. 8.
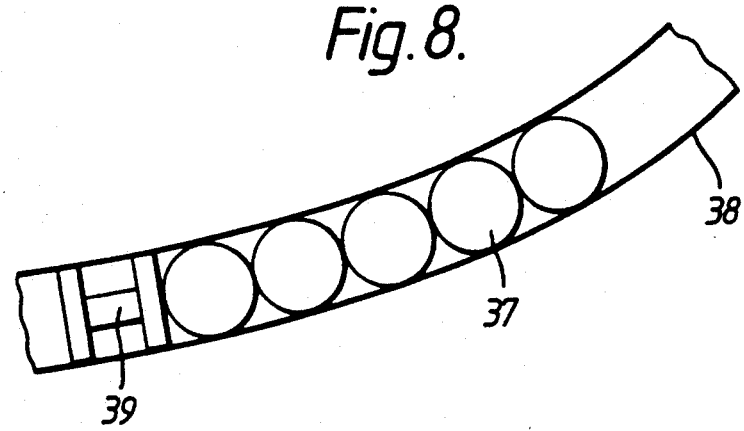

METHOD OF CONTROLLED BENDING OF A PIPELINE DURING LAYING THEREOF IN THE SEA

FIELD OF THE INVENTION

The invention relates to a method of controlled bending of a pipeline during the laying thereof in the sea, utilizing bend controlling/stopping means which interact with the pipeline. The invention also relates to bend controlling/stopping devices for use in the laying of a pipeline in the sea, comprising elements which are interconnected with limited possibility for pivotal movement therebetween about axes perpendicular to the pipeline axis.

BACKGROUND OF THE INVENTION

Steel pipelines to be laid on the bottom of the sea cannot be pre-formed or pre-adapted to the contour of the sea floor. This is because of the laying or installation procedure that must be used.

There may be tolerated a certain degree of unevenness over which the pipeline is capable of spanning or bending, provided the specific load does not produce excessively high tensile stresses in the steel. If tensile stresses exceed allowable limits, the pipeline could be deformed permanently, either by buckling or cold bending, or both. Should cold bending occur, it could propagate uncontrollably. Requirements set by classification societies for construction and operation of offshore pipelines permit a certain degree of cold bending provided that this takes place under controlled conditions. Parameters for such controlled conditions entail that a pipeline may be cold bent to a minimum radius equating to 2% strain, which is 10 times the value allowed for elastic conditions.

Pipelines to be laid on an uneven sea floor are subjected to free span because of the excessive rigidity of the pipeline. If the steel material in the pipeline wall is strained within elastic limits, a stretching of 0.2% is usually allowable. Specifications used for offshore pipelines, however, permit plastic deformation of up to 2.0% extension provided positive measures are taken to ensure that this value is not exceeded once yielding has commenced. By allowing plastic deformation, it is possible to reduce to a considerable degree the occurrence of free spanning. Deformation may be achieved by overloading the pipeline with respect to its bending capacity, by increasing the weight.

Marine pipelines having a diameter of more than 12 inches usually require a concrete coating to achieve negative buoyancy, which is necessary if the pipeline is to be submerged and also maintain a stable state with respect to the sea current. Plastic deformation of a pipeline having a weight coating of concrete will cause the concrete to crack and break loose.

PRIOR ART

In order to achieve desired bending, it is known to utilize equipment which is placed at a selected location around the pipeline and which exerts an external force thereon to achieve the bending that is sought. Hence there is known from U.S. Pat. No. 3,893,305 a pipeline bending apparatus comprising a plurality of spaced cylindrical segments sleeved over the pipeline at a selected location. The adjacent segments are pivotally inter-connected on one side of the pipeline, and the cylindrical segments placed at the ends are pivotally interconnected by means of a cylinder/piston arrangement on the other side of the pipeline. By actuation of the cylinder/piston arrangement, a bending force can be exerted on the pipeline. In this manner, however, it is possible to control the bending in one plane only.

From U.S. Pat. No. 4,647,225 is known a bend controlling device. Tubular elements are pivotally interconnected in alternating x- and y-planes, and these tubular segments have limited possibility for pivotal movement relative to each other. Here, control of the bending can be effected in two major planes.

OBJECT OF THE INVENTION

The purpose of the invention is to achieve a controlled bending in an advantageous and reliable way, with a high degree of security in all planes, i.e., in all directions about the circumference of the pipeline. This is of particular importance for laying of a pipeline in the sea because the pipeline is subjected to free spanning for long stretches and behaves, to a large extent, as a flexible, elongated element.

A specific intention of the invention is to permit controlled deformation (cold bending) of the pipeline during the laying thereof. This has the consequence that a longer length of pipeline is required due to the need to follow the contour of the sea floor more precisely than if deformation were not to occur (free span within elastic limits). The bending must therefore take place during laying, i.e., at a point in time when extra length may be added to the pipeline.

SUMMARY OF THE INVENTION

According to the invention, therefore, we propose a method of controlled bending of a pipeline during the laying thereof in the sea, utilizing bend controlling/stopping means which interact with the pipeline, said method according to the invention being characterized by the feature that the pipeline is weight loaded internally at the selected bending zone.

By weight loading the pipeline in this manner, it is possible to achieve cold bending at the same time as attaining the security that the criteria pertaining to plastic bending is not exceeded, neither vertically nor horizontally. For concrete coated pipelines, there is the added advantage that cold bending may be achieved, without the risk of cracking and breaking loose of the concrete at the place of the bending, as the weight requirement normally satisfied by concrete is replaced by the weight of the sleeve. The invention may of course be used also for pipelines without a concrete coating.

The weight loading in accordance with the invention may advantageously be accomplished by insertion of a flexible string of weight elements into the pipeline.

In this connection, the string of weight elements utilized may advantageously be a length of chain.

The flexible string of weight elements may be attached to a pulling line, whereby it is possible to restrict the effect of weight loading to the desired location of within the pipeline.

It may be advantageous to utilize a "stopper" in the pipeline—for example, a buckle detector—which is connected to the end of the weight string.

The weight loading may also be made advantageously by using a suitable heavy and readily flowable weight mass. Such a weight mass may, for example, be heavy drilling fluid. The afore-mentioned stopper is in this connection used to close off the downward interior area of the pipeline.

One may of course also contemplate a combination of a flexible string of weight elements and the use of a suitable heavy and readily flowable weight mass.

It would also be possible to use a line of separate spherical weight bodies for internal weight loading, moved forward by a pig.

Within the scope of the invention, it may be particularly advantageous as bend controlling/stopping means to use tube sleeves positioned on the pipeline and interconnected with pipe couplings, the halves of which couplings are held together in overlapping relationship by a lock ring disposed in two aligned annular grooves in the coupling halves. The tolerances between the lock ring and the annular grooves will permit the required angular deflection in the couplings corresponding to the allowed angular deformation for the pipeline. The spacing between the couplings along the pipeline will determine the location of the bending. Use of such couplings ensures the desired deformation in all planes, which, as mentioned before, is of particular importance in connection with laying of marine pipelines.

Within the scope of the invention there is also proposed a bend controlling/stopping device for use on the pipeline during laying thereof in the sea, comprising tube sleeves which are interconnected with limited possibility for pivotal movement therebetween about axes perpendicular to the pipeline axis, this new device being characterized by the feature that the tube sleeves are mutually interconnectable by means of couplings of the type comprising overlapping pipe coupling halves held together by a lock ring disposed in two aligned annular grooves in the pipe coupling halves. Such a device affords the advantages described in the preceding paragraph.

As bend controlling/stopping means there may also be used a gutter-like ramp which supports the pipeline and consists of a plurality of spaced U-shaped elements connected together by hinges.

BRIEF DESCRIPTION OF THE DRAWINGS

The invention will now be explained in more detail with reference to the drawings, where:

FIG. 6 shows a side view of a bend controlling ramp, and FIG. 7 shows a cross-section of a sector of the ramp in FIG. 6, while FIG. 8 shows a schematic section through a pipeline with spherical bodies as means of internal weight loading.

DETAILED DESCRIPTION OF THE PREFERRED EMBODIMENT OF THE INVENTION

Figure 1:
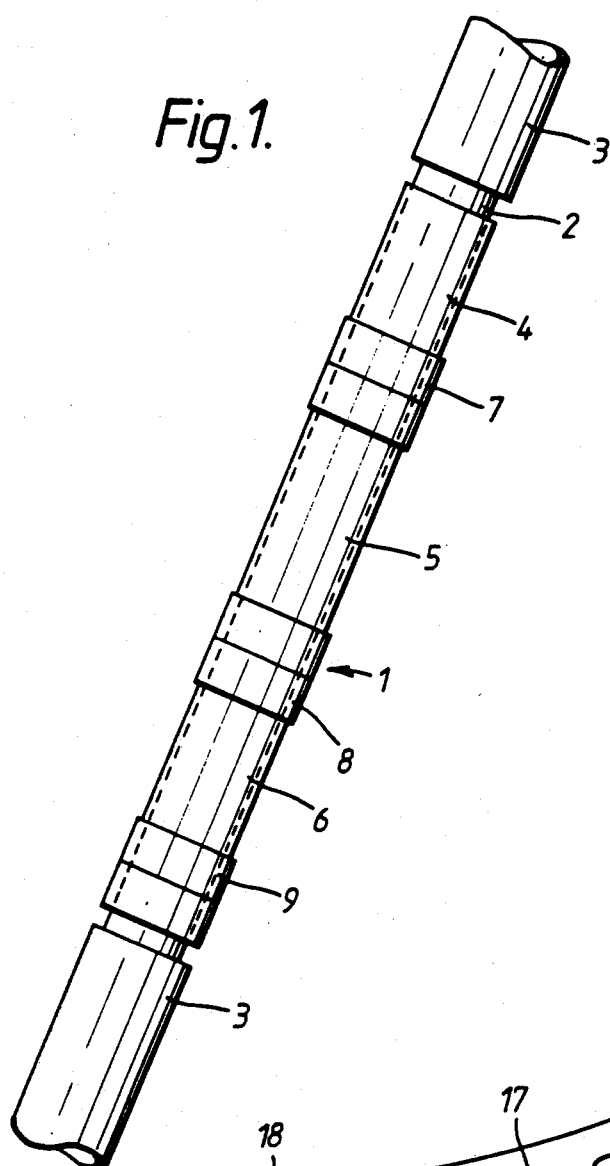
FIG. 1 shows a section of a pipeline with a bend controlling/stopping device according to the invention.

In FIG. 1 is shown a section of pipeline 1. The actual pipeline, constructed of steel, is designated by 2, and it is provided with an external concrete coating 3. This concrete coating has been removed from a sector of the pipe, at which place on pipeline 2 are positioned three tube sleeves 4, 5 and 6. These three tube sleeves are interconnected by means of couplings 7 and 8. The entire assembly 4–8 is connected to pipeline 2 by means of coupling 9, of the same type as couplings 7,8, and welded to the pipeline.

Figure 4:
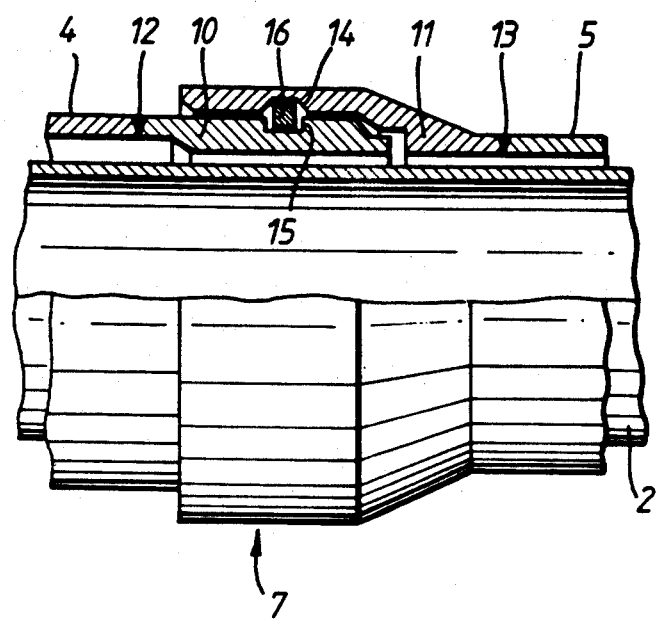
FIG. 4 shows a section through a coupling of the type that may be used in the device of FIG. 1.

Couplings 7, 8 and 9 in the embodiment example are of the type indicated in FIG. 4, which shows a semi-section through coupling 7. Coupling 7 consists, as shown, of two overlapping coupling halves 10 and 11. Coupling half 10 is welded permanently at 12 to tube sleeve 4. Coupling half 11 is permanently welded at 13 to tube sleeve 5. The two coupling halves 10,11 have two mutually aligned annular grooves 14,15 into which lock ring 16 is inserted. The tolerance between the annular grooves and the lock ring will be a determining factor for the degree of angular deviation that may be accepted by the coupling. These angular deviations will also determine the maximal bending to which pipe 2 extending through tube sleeves 4,5 and coupling 7 may be subjected.

Figure 2:
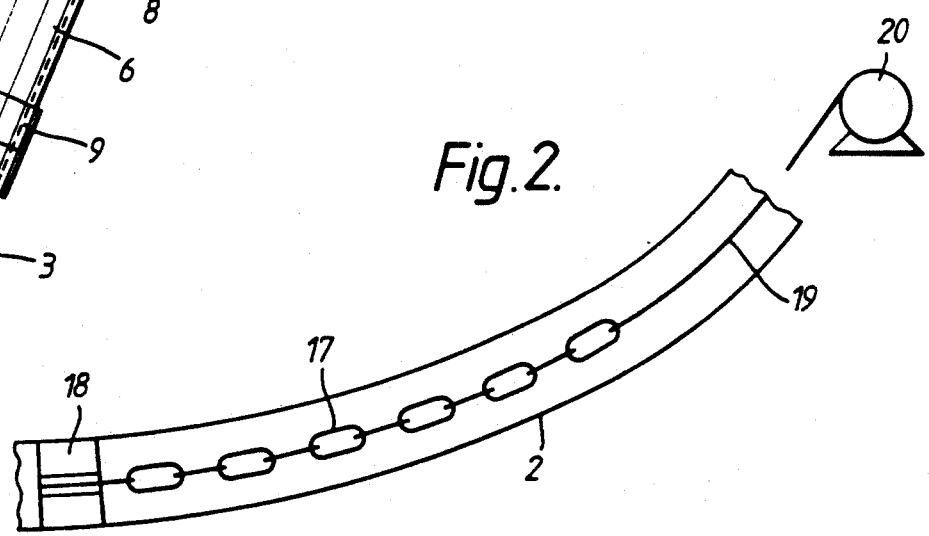
FIG. 2 shows a schematic section through the pipeline in the area shown in FIG. 1, with the bend controlling device omitted for the sake of clarity.

The forces acting on pipeline 2 during laying are limited, as the pipe is empty, to, in addition to the pipeline's own weight, the extra load contributed by concrete coating 3, in particular, as well as in this case the internal load that chain length 17 shown in FIG. 2, for example, will exert on pipeline 2. As mentioned above, the tube sleeve and couplings have not been drawn into FIG. 2, but the bend controlling/stopping device is placed about pipe 2 in the area where chain length 17 is situated.

Here, chain length 17 is connected at one end thereof with a buckle detector 18. The length of chain in this instance replaces the conventional pulling line for the buckle detector. The buckle detector is not essential to the implementation of the invention. Chain length 17 is brought into position with the aid of the indicated line 19, which passes upward through pipeline 2 to a suitable winch or similar mechanism at the free end of the pipe at the surface. In FIG. 2 a winch is indicated by number 20. When an extra length of pipe is added to the pipeline, the weight is moved forward with the aid of the winch line.

Figure 3:
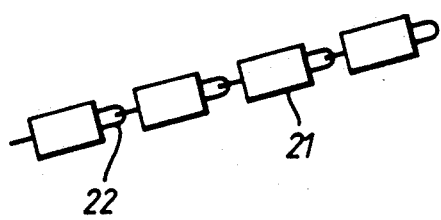
FIG. 3 shows a variant of the weight loading shown in FIG. 2.

A variant of the weight chain shown in FIG. 2 is indicated in FIG. 3, where solid metal elements 21 are interconnected by means of universal joints 22. The elements may have many different forms including, for example, spherical.

Instead of or in combination with weight chain 17, for example, there may be employed a heavy, readily flowable mass that is filled into the pipeline during laying thereof. A stopper (not shown) serves to seal the pipe, i.e., to limit the downward extension of the weight mass.

The weight mass could be pumped in or out with the aid of suitable means which would be well known to a person skilled in the art and are therefore not shown in more detail here.

Figure 5:
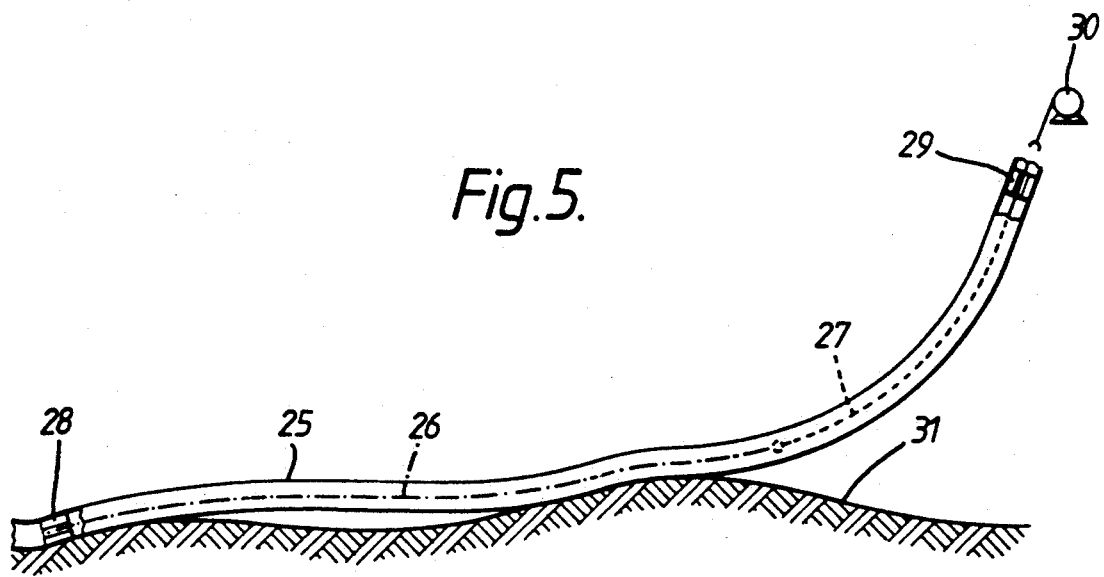
FIG. 5 shows a typical situation for laying a pipeline.

FIG. 5 shows a pipeline 25 during laying. Inside the pipeline is a weight string 26, shown here in the form of a length of chain which is fed in by line 27. In each end of the pipe section shown is a buckle detector 28 and 29. A winch is designated by 30. The sea floor is indicated by 31.

In FIG. 6 and 7 is schematically shown a ramp 32 which may serve as a bend controlling device for pipeline 33. The ramp is built up of a number of U-shaped elements 34 hinged together by means of fish plates 35 having horizontal pivot axes. The individual elements 34 are spaced closely together, permitting limited pivotal or tilting movement therebetween, as indicated in FIG. 6, where the sea floor is designated by 36.

FIG. 8 shows the use of separate spherical weight bodies 37 in pipeline 38 during laying in the sea. The line of bodies 37 is retained/actuated by pig 39. By means of the pig, weight bodies 37 may be pushed through the pipeline. A pig may optionally be positioned at both ends of the line of weights, with the attendant possibility of shifting the weights in either direction through the pipeline. The weight bodies are shown as spheres, but may of course have a form different from that of a sphere.

Having described my invention, I claim:

1. A method of controlled bending of an empty pipeline during the laying thereof on a bed in the sea, said method comprising the steps of;
   locating and engaging a bend controlling/stopping means for limiting said controlled bending of said pipeline to a predetermined angular configuration on an exterior of said empty pipeline at a selected bending zone of said pipeline on said bed,
   transporting weight-loaded means for bending by weight said empty pipeline along an interior of said empty pipeline to said selected bending zone of said empty pipeline on said bed,
   wherein weight of said weight-load means permanently bends said empty pipeline to a predetermined angular configuration in cooperation with said bend controlling/stopping means and said bed.

2. A method according to claim 1, wherein said weight loaded means comprises a flexible string of weight elements.

3. A method according to claim 1, wherein said weight loaded means comprises a length of chain.

4. A method according to claim 1, wherein said weight loaded means comprises a heavy, readily flowable weight mass drilling fluid.

5. A method according to claim 1, wherein a suitable stopper is inserted into said empty pipeline at an end of said selected bending zone in front of said weight loaded means.

6. A method according to claim 1, wherein said weight loaded means comprises spherical bodies transported by a pipeline pig.

7. A method according to claim 1, wherein said bend controlling/stopping means comprises tube sleeves positioned on said empty pipeline and interconnected with pipe couplings, wherein coupling halves of said pipe couplings are engaged together in overlapping relationship by a lock ring disposed in two aligned annular grooves in said coupling halves.

8. A method according to claim 1, wherein said controlling/stopping means comprises a gutter-like ramp which supports the pipeline and consists of a plurality of successive spaced apart U-shaped elements connected together by hinges.

* * * * *